(12) United States Patent
Horng et al.

(10) Patent No.: US 6,632,474 B1
(45) Date of Patent: Oct. 14, 2003

(54) ROBUST HARD BIAS/CONDUCTOR LEAD STRUCTURES FOR FUTURE GMR HEADS

(75) Inventors: Cheng T. Horng, San Jose, CA (US); Mao-Min Chen, San Jose, CA (US); Chen-Jung Chien, Sunnyvale, CA (US); Cherng-Chyi Han, San Jose, CA (US); Chyu Jiuh Torng, Pleasanton, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 242 days.

(21) Appl. No.: 09/689,932

(22) Filed: Oct. 13, 2000

(51) Int. Cl.⁷ .................................................. B05D 5/12
(52) U.S. Cl. ...................... 427/131; 427/129; 427/132; 427/130
(58) Field of Search ................................. 427/130, 127, 427/128, 129, 131, 132

(56) References Cited

U.S. PATENT DOCUMENTS

| 5,268,806 A | 12/1993 | Goubau et al. ............ 360/113 |
| 5,479,696 A | 1/1996 | McNeil ....................... 29/603 |
| 5,491,600 A | 2/1996 | Chen et al. ................. 360/113 |
| 5,492,720 A * | 2/1996 | Gill et al. ................... 427/131 |
| 5,883,764 A * | 3/1999 | Pinarbasi .................... 360/113 |
| 6,201,669 B1 * | 3/2001 | Kakihara .................... 360/113 |
| 6,452,204 B1 * | 9/2002 | Ishiwata et al. ............... 257/9 |

* cited by examiner

*Primary Examiner*—Brian K. Talbot
(74) *Attorney, Agent, or Firm*—George O. Saile; Stephen B. Ackerman

(57) ABSTRACT

A method for forming a thin conductive lead layer of high sheet conductivity, high hardness, high melting point, high corrosion resistance and lacking the propensity for smearing, oozing, electromigration and nodule formation. Said lead layer is formed upon the hard magnetic longitudinal bias layer of an abutted junction spin-valve type magnetoresistive read head and said read head is therefore suitable for reading high density recorded disks at high RPM.

9 Claims, 1 Drawing Sheet

ROBUST HARD BIAS/CONDUCTOR LEAD STRUCTURES FOR FUTURE GMR HEADS

RELATED PATENT APPLICATION

This application is related to Docket No. HT 99-028, Ser. No. 09/483,937, filing date Jan. 18, 2000, assigned to the same assignee as the current invention.

This application is also related to Docket No. HT 00-002, Ser. No. filing date, assigned to the same assignee as the current invention.

BACKGROUND OF THE INVENTION

1. Field of the Invention

This invention relates generally to the fabrication of a giant magnetoresistive (GMR) magnetic field sensor for a magnetic read head, more specifically to the formation and material composition of its conductive lead layers.

2. Description of the Related Art

Magnetic read sensors that utilize the magnetoresistive effect for their operation fall broadly into two classes: those that use the anisotropic magnetoresistive effect (AMR) and those that use the giant magnetoresistive effect (GMR). AMR based sensors are simplest in structure, since they require a single magnetic layer whose resistance varies in proportion to the angle between its magnetization vector and the direction of electron flow (the sensing or bias current) through it. GMR based sensors are typically implemented in a more complex configuration, the spin-valve (SVMR). The spin-valve structure also involves a sensing current, but it has two separated magnetic layers, one whose magnetization direction can change (the free layer) and the other whose magnetization direction is fixed. The spin-valve's resistance is proportional to the angle between the magnetization of these two layers and the direction of the sensor current through them plays little role in the operation. Both forms of sensor require a method for providing a sensing current and that method typically involves the formation of thin, conducting lead layers on either side of the sensor. The spin-valve sensor also requires an additional magnetic layer, called the longitudinal bias layer, which maintains the free magnetic layer of the sensor in a stable orientation and a single magnetic domain state. In the SVMR sensor, the bias layer is typically formed of a hard magnetic material and is positioned on either side of the sensor element. Because of the location of the longitudinal magnetic bias layer, it has become accepted practice in the prior art to form the conductive lead layer directly over the magnetic bias layer. Given their relatively passive electromagnetic role in the sensor operation, the conductive lead layers need only satisfy certain basic, albeit stringent, material requirements. They must have a low sheet resistance, they must withstand the rigors of the harsh environment encountered during normal operation of the read head (eg. contact with the rapidly moving magnetic medium) and resist the equally harsh treatment associated with certain fabrication processes (eg. applications of corrosive chemicals) and they must not adversely affect the material properties of the magnetic bias layer on which they are formed.

The lead layers fabricated in accordance with the methods of the prior art have consisted mainly of layered structures such as Ta/Au/Ta, Cr/Ta/Cr, Ta/Mo/Ta, TiW/W/TiW. For example, McNeil (U.S. Pat. No. 5,479,696) provides a combination read/write magnetic head in which the conducting leads are a Ta/Au/Ta lamination.

Goubau et al. (U.S. Pat. No. 5,268,806) disclose a lead layer structure which comprises a thin film layer of body-centered-cubic (bcc) tantalum (alpha-phase Ta) which is separated. from the sensor element by a thin film seed layer formed of material taken from the group consisting of TiW, TaW, Cr and W. The alpha-phase tantalum has a particularly low bulk resistivity of about 13 micro-ohm-cm at 300 K. The other layer provides a conforming substrate with similar atomic structure as well as corrosion and heat resistance.

Chen et al. (U.S. Pat. No. 5,491,600) disclose a multilayered conductive lead structure consisting of layers of conductive material alternating with layers of refractory metal, such as layers of gold/nickel alloy alternating with layers of tantalum. Gold is highly conductive, but its softness results in electromigration, smearing and nodule formation during sensor use. Tungsten has excellent conductivity and is harder than gold, but is subject to corrosion problems. Materials such as TiW/Ta have higher bulk resistivity and therefore require thick layers for adequately low sheet resistivity.

Pinarbasi (U.S. Pat. No. 5,883,764) discloses a method for forming very thin and highly conductive lead layers over the longitudinal bias layers of a spin-valve type read sensor. The lead layer structure comprises two adjacent seed layers of refractory metals deposited to modify the crystallographic texture of subsequent layers. A layer of highly conductive material is then deposited over said first and second seed layers. The structure finally provided by Pinarbasi comprises a CoPtCr hard bias layer over which is formed a conductive lead layer consisting of a Ta/Cr seed bilayer on which is then deposited a Ta lead layer.

As recording densities on magnetic media continue to increase, the associated read head sensors must become both narrower and thinner. Increasing the thinness of a sensor requires that both its longitudinal magnetic bias layer and the conductive lead layer formed over it become thinner. The formation of thinner longitudinal bias layers, in turn, requires new magnetic materials, structures and methods of formation. The formation of thinner lead layers requires conducting materials of extremely high bulk conductivity so that their sheet conductivity is correspondingly high as the material is formed in very thin layers. In addition, the materials comprising the conductive lead layers must retain the desirable properties of hardness, high melting point and corrosion resistance so as to survive the rigors of a harsh operating and fabricating environment. Most importantly, the formation of lead layers on longitudinal bias layers of new hard magnetic material requires careful attention to the physical consequences of crystallographical matching between the magnetic layer and the conducting layer and between the various material layers that comprise the conductive lead layer itself. It is towards these considerations that the objects of the present invention are addressed.

SUMMARY OF THE INVENTION

A first object of this invention is to provide a method for forming conductive lead layers for a spin-valve type magnetoresistive sensor element, which lead layers will have the properties of low sheet resistance, high hardness, high melting point and corrosion resistance required for the harsh operating and fabricating environments of current and future magnetic read head applications.

A second object of the present invention is to provide a method for forming conductive lead layers over longitudinal magnetic bias layers of new hard magnetic materials such that the conductive lead layers retain the desired properties of low sheet resistance, high hardness, high melting point and corrosion resistance required for the harsh operating and fabricating environments of current and future magnetic read head applications.

A third object of the present invention is to provide a method for forming conductive lead layers for a spin-valve type magnetoresistive sensor element that avoids the problems of lead oozing, smearing, electromigration and nodule formation associated with Ta/Au/Ta and similar lead layer structures of the prior art.

A fourth object of the present invention is to provide a method for forming conductive lead layers for a spin-valve type magnetoresistive sensor element that retain the overall thinness of the sensor element when said lead layers are formed over longitudinal magnetic bias layers of new hard magnetic materials.

In accord with the objects of this invention there is provided a spin valve magnetoresistive sensor having abutted junctions (on the sensor ends) upon which are successively layered a seed layer, a longitudinal magnetic bias layer of hard magnetic material and a conductive lead layer. The typical hard magnetic bias material provided is comprised of CoPtCr (or CoPt), which, being formed on a seed layer which is a bilayer of Ta/Cr, exhibits high coercivity and squareness (see, in this regard, related patent application HT00-002). Over the CoPtCr hard magnetic bias layer is then formed an "interrupt" layer of amorphous Ta, whose purpose is to provide a crystallographic match with the conductive lead layer formed upon it. Said crystallographic match would not properly occur if the conductive layer were formed directly on the magnetic bias layer. The conductive lead layer is itself a lamination comprising, in one embodiment, a layer of NiCr on which is formed a layer of Ru (or Rh or Ir) and on which is formed a final layer of NiCr. The interrupt layer of amorphous Ta allows the NiCr to grow with a (111) close packed plane parallel to the film plane and, thereby, to produce low sheet resistance in the NiCr/Ru/NiCr lamination due to specular reflection of the conduction electrons in the Ru layer (see, in this regard, related patent application HT99-028). The conductive lead layer so formed compares favorably in its sheet conductance to the standard prior art layer lamination of Ta/Au/Ta, yet is far superior in respect to the, desired physical properties of hardness, high melting point, corrosion resistance and resistance to oozing, smearing, electromigration and nodule formation. In another embodiment, the objects of the present invention are met by forming a conductive layer of Rh or Ir directly on the hard magnetic layer of CoPtCr, without an intervening interrupt layer and without a layer of NiCr beneath the conductive layer.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figure, wherein.

DESCRIPTION OF THE PREFERRED EMBODIMENTS

Figure 1:
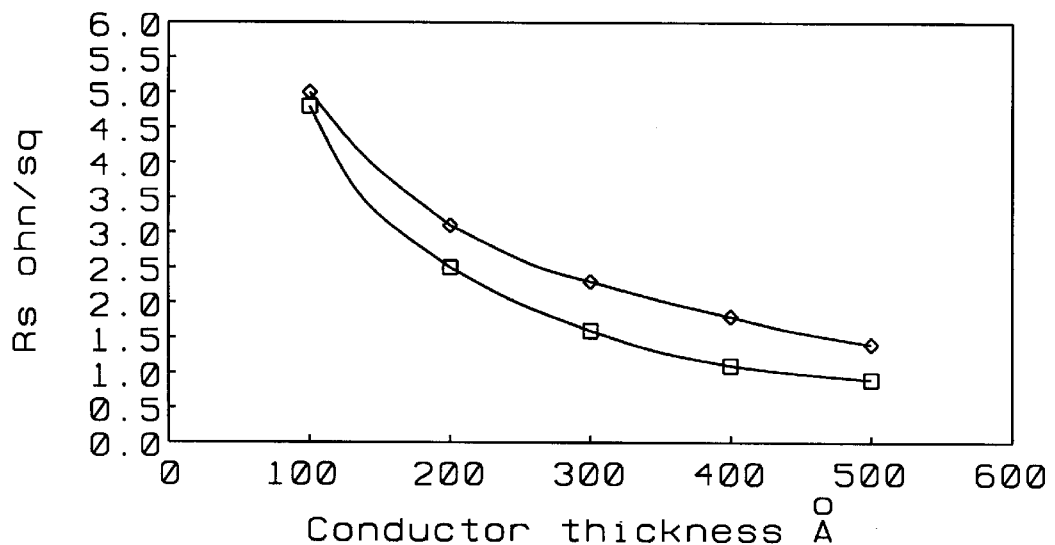
FIG. 1 is a graphical representation of the results of a series of experiments to determine the functional relationship between the thickness of a conducting layer and the sheet resistance of a configuration consisting of a seed layer, a hard magnetic layer, the conductor layer in question and a capping layer. Two graphs are shown, one for the configuration of a preferred embodiment having Rh as a conductor, the other for a configuration having the usual Ta/Au/Ta conductor configuration of the prior art.

The present invention provides a thin conductive lead layer of high sheet conductivity, high hardness, high melting point, high corrosion resistance and lacking the propensity for smearing, oozing, electromigration and nodule formation associated with lead layers of the prior art. Said properties make the lead layer so provided particularly suitable for formation over a longitudinal bias layer of hard magnetic material on an abutted junction type spin valve sensor element for use in reading high density recordings at high RPM.

General Discussion

At the present time, as noted above in the prior art description, conductor lead layers are typically formed of laminates of Ta/Au/Ta. This combination has proven satisfactory as it provides relatively low sheet resistance, due to the Au layer, and high corrosion resistance. It is anticipated, however, that the Ta/Au/Ta arrangement and others like it also cited in the prior art description, will no longer prove suitable for use in newer sensors intended for use in high performance or high data rate drives. These sensors will require leads that, in addition to the aforementioned properties of low sheet resistance and corrosion resistance, are also harder and have a higher melting point. These additional properties are needed because of the harsher environment in which these sensors will be required to operate, e.g. in drives with appreciably higher RPM.

The present inventors have proposed two conductor lead embodiments for newer head applications (see related patent application HT99-028). These lead layers are made of (a) NiCr(55 A)/Ru (450–550 A)/NiCr (55 A) and (b) NiCr(55 A)/Rh (400–500 A)/NiCr (50 A), each characterized by a sheet resistance of between approximately 1.5–1.6 ohms/sq. The inventors have also proposed a longitudinal hard magnetic bias layer embodiment having high coercivity and squareness comprising an abutted junction spin-valve type sensor element upon which is formed a seed layer of Ta/Cr with a hard magnetic layer of CoPtCr formed upon it. The CoPtCr has an hexagonal close packed crystal structure like that of Ru. When CoPtCr is deposited on a Cr under-layer (ie the upper layer of the Ta/Cr seed layer), its close packed plane is perpendicular to the film plane. As illustrated in related patent application HT99-028, low resistance leads of Ru or Rh are a result of growing the Ru or Rh on the NiCr underlayer, which is formed with its (111) close packed plane parallel to the film plane. Low sheet resistance is then a result of the specular reflection of conduction electrons at the NiCr/Ru and NiCr/Rh interface.

When the SVMR sensor is fabricated, the CoPtCr hard magnetic layer becomes the underlayer for growing the NiCr/Rh (or Ru) conductor lead layer. This sequence of layers, however, does not yield a lead layer structure with low sheet resistance. The reason for this seems to be a mis-match in crystal orientation between the hard magnetic layer and the conductor layer. To obtain the desired low resistance configuration, it was determined that an "interrupt" layer must be interposed between the CoPtCr and the NiCr/Ru (or Rh). This "interrupt" layer is a layer of Ta, which has an amorphous structure, like aluminum oxide.

The NiCr layer, when deposited upon the amorphous Ta layer is formed with its (111) close packed plane parallel to the film plane and the desired low sheet resistance is again obtained. It is also found that structure matching between the hard magnetic layer and the conductor layer can be obtained if the NiCr is removed from the layer sequence Cr/CoPtCr/NiCr/Rh (or Ir)/NiCr. In this situation the close packed plane of the CoPtCr and the Rh will be in a direction perpendicular to the plane of the layer.

Experimental Results and Discussion

Using the Veeco ion-beam deposition system (IBD), various conductor lead layer structures were formed. To determine the most suitable configurations, NiCr/Rh/NiCr, NiCr/Ru/NiCr, Cr/Ta/Cr and Ta/Mo/Ta laminates were first examined. The NiCr/Ru/NiCr and NiCr/Rh/NiCr conductor lead layers, which were found to have the lowest sheet resistance, were then incorporated into varied PM/conductor layer (PM meaning permanent magnet or hard magnetic material) structures in which the conductor (Ru or Rh) thickness, x, could be varied, ie:

Cr(100 A)/CoCrPt(450 A)/NiCr(100 A)/Rh(x)/NiCr(50 A),

Cr(100 A)/CoCrPt(450 A)/Ta(50 A)/NiCr(50 A)/Rh(x)/NiCr(50 A),

Cr(100 A)/CoCrPt(450 A)/Rh(x)/NiCr(30 A), and:

Cr(100 A)/CoCrPt(450 A)/NiCr(100 A)/Ru(x)/NiCr(50 A),

Cr(100 A)/CoCrPt(450 A)/Ta(50 A)/NiCr(50 A)/Ru(x)/NiCr(50 A),

Cr(100 A)/CoCrPt(450 A)/Ru(x)/NiCr(30 A).

For comparison purposes, standard PM/conductor structures of the form:

Cr(100 A)/CoCrPt(450 A)/Ta(100 A)/Au(x)/Ta(100 A) were also fabricated. Annealing of the conductor layers and the structures above was done by using a 280° C.-5 hour cycle, which is used in sensor element annealing.

Functional properties of the conductor lead structures are listed in Table 1, below and properties of the PM/conductor structures are listed in Table 2, below. Mo and Ta were ultimately dropped from the conductor list because of higher sheet resistivity (see Table 1) and poor corrosion resistance of the former. Reference to specific deposition rates in column 4 of Table 2 is to the deposition rates of the central conducting layer of the triply laminated layer, ie.: Au at 124 A/min, Rh at 115 A/min and Ru at 60 A/min.

TABLE 1

| Lead Layer (angstroms) | Xtal Type | Resistivity (as dep.) $\mu$-ohm-cm | Resistivity (annealed) $\mu$-ohm-cm | Melting Point (° C.) | Hardness (Vickers) | Corrosion Resistance |
| --- | --- | --- | --- | --- | --- | --- |
| Ta(50)/Au(500)/Ta(50) | FCC | 3.8 | 4.4 | 1064 | 40 | good |
| NiCr(100)/Rh(500)/NiCr(100) | FCC | 9.3 | 8.0 | 1965 | 210 | good |
| NiCr(100)/Ru(500)/NiCr(100) | HCP | 9.2 | 8.8 | 2310 | 550 | good |
| Cr(100)/Mo(500)/Cr(100) | BCC | 11.4 | 10.6 | 2617 | 225 | poor |
| Cr(100)/Ta(500)/Cr(100) | BCC | 18.3 | 17.0 | 2996 | 150 | good |

TABLE 2

| PM/conductor (angstroms) | $R_s$ | Stress dyne/cm$^2$ | dep. rate A/min | $M_r t$ | $H_c$ (Oe) | Sq | Cost |
| --- | --- | --- | --- | --- | --- | --- | --- |
| Cr(100)/CoPtCr(450)/Ta(100)/Au(300)/Ta(100) | 1.57 | -7.00E+09 | 124 | 3.52 | 1600 | 0.84 | 1.0 |
| Cr(100)/CoPtCr(450)/NiCr(100)/Rh(500)/NiCr(50) | 1.67 | -2.60E+09 | 115 | | | | 2.0 |
| Cr(100)/CoPtCr(450)/Ta(50)/NiCr(50)/Rh(500)/NiCr(50) | 1.38 | | | | | | |
| Cr(100)/CoPtCr(450)/Rh(500)/NiCr(30) | 1.42 | | | 3.35 | 1610 | 0.86 | |
| Cr(100)/CoPtCr(450)/NiCr(100)/Ru(500)/NiCr(50) | 1.89 | -1.10E+10 | 60 | | | | 0.2 |
| Cr(100)/CoPtCr(450)/Ta(50)/NiCr(50)/Ru(500)/NiCr(50) | 1.54 | | | | | | |
| Cr(100)/CoPtCr(450)/Ru(500)/NiCr(30) | 1.92 | | | | | | |

The Ta underlayer in the first configuration (row 1) in Table 2 serves two purposes. First, interdiffusion between the Ta and Au hardens the Au layer. Second, the Ta serves as a barrier to Au diffusion into the CoPtCr hard magnetic layer. The capping layer is thinner for the configurations where Rh and Ru are the conductors because the Rh and Ru form smoother layers. Comparing the fourth configuration (row 5) with the first configuration (row 1), it is noted that the elimination of the. Ta/NiCr barrier layer does not degrade the hard magnetic properties. Among the 3 conductor lead materials, the Ru has the lowest cost.

For the newer SVMR head configurations, the shield-to-shield spacing is becoming progressively smaller. Thus, the stack height of the PM/conductor layers must be kept as small as possible if the problem of shorting to the shield is to be eliminated. Referring now to FIG. 1, there is shown a graph comparing the sheet resistance ($R_s$) vs thickness (x) for two configurations, PM/Au and PM/Rh. From this data, we can design the conductor lead structures for the future head configurations.

Table 3, below, illustrates the PM/Rh conductor lead designs, to obtain $R_s=1.5$ and 2.0 ohms/sq. The first and third configurations (rows 1&4) are PM/Au lead configurations and are included for reference. It is also noted that the capping layer for the Rh conductor is Cr instead of NiCr, thus eliminating one additional target to be used in the ion-beam deposition system.

TABLE 3

| $R_S$ (ohms/sq) | PM/conductor configuration | Conductor thickness (angstroms) |
|---|---|---|
| 1.50 | Ta/Cr(100)/CoPtCr(450)/Ta(100)/Au(310)/Ta(100) | 510 |
| 1.50 | Ta/Cr(100)/CoPtCr(450)/Rh(475)/Cr(30) | 505 |
| 2.00 | Ta/Cr(100)/CoPtCr(450)/Ta(100)/Au(240)/Ta(50) | 390 |
| 2.00 | Ta/Cr(100)/CoPtCr(450)/Rh(350)/Cr(30) | 380 |

Figure 2:
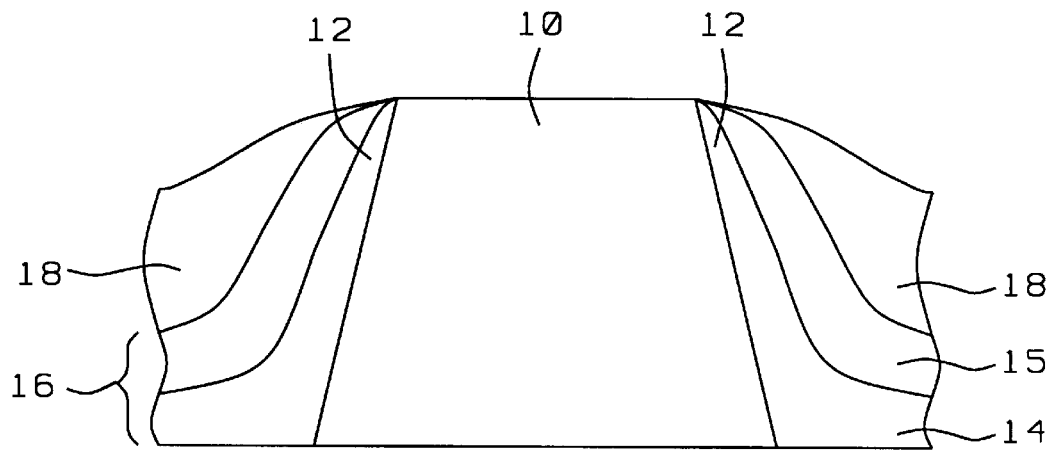
FIG. 2 is a schematic diagram of the air bearing surface (ABS) of an abutted junction spin-valve type sensor element showing a layered configuration formed on each junction end consisting of a seed layer, over which is formed a hard magnetic bias layer, over which is formed a conducting lead layer using the methods of the present invention.

Referring now to FIG. 2, there is shown a schematic view of an air bearing surface of a SVMR stack (10) having abutted junctions (12), upon which has been formed a hard magnetic (PM) layer (16) to provide longitudinal bias and, over said layer, a conductive lead layer (18), both formed in accord with the methods of the present invention. The PM layer (16), serving here as an underlayer for the conductor lead layer (18) comprises a seed layer (14), which can be a structure such as Ta(50 A)/Cr(50–15 A), upon which is formed a layer (15) of hard magnetic material, such as CoPtCr(350–500 A). The conductor lead layer (18), formed upon the PM layer so that their close packed planes are both perpendicular to the film plane, comprises a layer of a conducting material such as Rh, or Ir (the Ir having properties in every respect similar to those of Rh), upon which is then formed a capping layer of either Ta or Cr. For example, the PM/conductor configuration could be:

1) Ta(50 A)/Cr(100 A)/CoPtCr(350–500 A)/Rh(250–500 A)/Cr(30)
2) Ta(50 A)/Cr(100 A)/CoPtCr(350–500 A)/Ir(260–515 A)/Cr(30)

In an alternative embodiment which utilizes a Ta interrupt layer, the PM layer Ta(50 A)/Cr(100 A)/CoPtCr(350–500 A) remains the same, but the conductive lead layer could be:

3) Ta(50 A)/NiCr(50 A)/Ru(365–520 A)/NiCr(3 A).

As is understood by a person skilled in the art, the preferred embodiments of the present invention are illustrative of the present invention rather than limiting of the present invention. Revisions and modifications may be made to methods, materials, structures and dimensions employed in fabricating a thin conductive lead layer of high sheet conductivity, high hardness, high melting point, high corrosion resistance and lacking the propensity for smearing, oozing, electromigration and nodule formation, while still providing a method for fabricating such a thin conductive lead layer of high sheet conductivity, high hardness, high melting point, high corrosion resistance and lacking the propensity for smearing, oozing, electromigration and nodule formation in accord with the spirit and scope of the present invention as defined by the appended claims.

What is claimed is:

1. A method for forming a thin conductive lead layer of high sheet conductivity, high hardness, high melting point, high corrosion resistance and lacking the propensity for smearing, oozing, electromigration and nodule formation comprising:

providing a laminated hard magnetic underlayer comprising a seed double layer of Ta/Cr, upon which is formed a layer of the hard magnetic material CoPtCr or CoPt;

forming over said underlayer an "interrupt" layer said layer being a layer of Ta having an amorphous structure and designed to orient the crystal plane of a layer formed upon it in a direction parallel to the plane of that layer;

forming over said "interrupt" layer a conductive lead layer having said properties of high hardness, high melting point high corrosion resistance and lacking the propensity for smearing, oozing, electromigration and nodule formation said lead layer being a three layer lamination comprising a first layer of NiCr, upon which is formed a conducting layer of Ru, Rh or Ir, upon which is formed a second layer of NiCr, the interfaces between the NiCr and the conducting material causing specular reflection of conduction electrons so as to enhance the sheet conductivity of the formation.

2. The method of claim 1 wherein the thickness of the Ta layer is in the range between 30 A and 100 A, the thickness of the Cr layer is between 50 A and 150 A and the layer of CoPtCr or CoPt is formed to a thickness between approximately 150 A and 500 A.

3. The method of claim 1 wherein the "interrupt" layer of Ta has a thickness of between 30 A and 75 A.

4. The method of claim 1 wherein the first layer of NiCr is formed to a thickness between 30 A and 75 A, the layer of Ru is formed to a thickness of between 250 A and 520 A and the second layer of NiCr is formed to a thickness between 30 A and 50 A.

5. A method for forming a thin conductive lead layer of high sheet conductivity, high hardness, high melting point, high corrosion resistance and lacking the propensity for smearing, oozing, electromigration and nodule formation comprising:

providing a laminated hard magnetic underlayer whose layer of hard magnetic material has its close packed crystal plane perpendicular to its layer plane, said underlayer further comprising a seed double layer of Ta/Cr, on which is formed a layer of the hard magnetic material CoPtCr or CoPt;

forming over said underlayer a layer of conducting material whose close packed crystal layer is also in a direction parallel to the underlayer and which thereby has high sheet conductivity resulting from the specular reflection of conduction electrons, said conducting material being Rh or Ir;

forming over said layer of conductive material a capping layer of Cr.

6. The method of claim 5 wherein the thickness of the Ta layer is in the range between 30 A and 75 A, the thickness of the Cr layer is between 50 A and 150 A, and the layer of hard magnetic material CoPtCr or CoPt, is formed to a thickness between approximately 150 A and 500 A.

7. The method of claim 5 wherein the layer of Rh is formed to a thickness of between 250 A and 500 A.

8. The method of claim 5 wherein the layer of Ir is formed to a thickness of between 250 A and 515 A.

9. The method of claim 5 wherein the capping layer of Cr, is formed to a thickness between 20 A and 50 A.

* * * * *